United States Patent [19]
Swanson et al.

[11] Patent Number: 5,947,457
[45] Date of Patent: Sep. 7, 1999

[54] FLUID-FILLED ACTIVE VIBRATION ABSORBER

[75] Inventors: Douglas A. Swanson, Cary, N.C.; Peter J. Jones, Erie, Pa.; Douglas E. Ivers, Cary, N.C.; Kevin C. Cooney, Erie, Pa.

[73] Assignee: Lord Corporation, Cary, N.C.

[21] Appl. No.: 08/835,436

[22] Filed: Apr. 8, 1997

[51] Int. Cl.⁶ ........................................................ F16F 5/00
[52] U.S. Cl. ............................. 267/140.14; 267/140.15; 244/54; 248/550
[58] Field of Search ............................. 267/136, 140.14, 267/140, 15, 219; 188/378, 379; 244/54; 248/550, 562, 566, 636, 638; 702/56

[56] References Cited

U.S. PATENT DOCUMENTS

| | | | |
|---|---|---|---|
| 3,085,657 | 4/1963 | Preis | 188/1 |
| 3,230,889 | 1/1966 | Brewer | 103/53 |
| 3,430,902 | 3/1969 | Lohr | 248/18 |
| 3,490,556 | 1/1970 | Bennett, Jr. et al. | 181/33 |
| 3,668,939 | 6/1972 | Schrader | 74/61 |
| 3,917,246 | 11/1975 | Gartner et al. | 267/136 |
| 4,356,098 | 10/1982 | Chagnon | 252/62.51 |
| 4,685,094 | 8/1987 | Vitringa et al. | 367/183 |
| 4,694,650 | 9/1987 | Vincent | 60/520 |
| 4,715,559 | 12/1987 | Fuller | 244/1 N |
| 4,724,923 | 2/1988 | Waterman | 181/208 |
| 4,760,996 | 8/1988 | Davis | 267/122 |
| 4,811,919 | 3/1989 | Jones | 244/54 |
| 4,935,651 | 6/1990 | Hong et al. | 310/51 |
| 5,067,684 | 11/1991 | Garnjost | 248/550 |
| 5,147,573 | 9/1992 | Chagnon | 252/62.52 |
| 5,174,552 | 12/1992 | Hodgson et al. | 267/140.11 |
| 5,231,336 | 7/1993 | van Namen | 318/128 |
| 5,236,186 | 8/1993 | Weltin et al. | 267/140.15 |
| 5,238,232 | 8/1993 | Kobayashi et al. | 267/140.14 |
| 5,251,863 | 10/1993 | Gossman et al. | 248/550 |
| 5,310,137 | 5/1994 | Yoerkie, Jr. et al. | 244/17.27 |
| 5,323,133 | 6/1994 | Heath et al. | 335/222 |
| 5,332,061 | 7/1994 | Majeed et al. | 180/312 |

(List continued on next page.)

FOREIGN PATENT DOCUMENTS

WO 96/12121  4/1996  WIPO .

OTHER PUBLICATIONS

Todd A. Bevan and Ronald G. Hund, "*Vibration Absorbers Quiet Propeller Noise*", #931283 1993, Society of Automotive Engineers, Inc.

(List continued on next page.)

*Primary Examiner*—Chris Schwartz
*Attorney, Agent, or Firm*—Randall S. Wayland

[57] ABSTRACT

A fluid-filled Active Vibration Absorber (AVA) (20) is described for attaching to, and controlling dynamic vibration of the member (22). The AVA (20) is comprised of primary tuning mass (23) preferably including an additional inertial tuning mass (26) which is associated with a primary resonant frequency (fn1), a flexible element (28) for interconnecting the primary mass (23) and, thus, interconnecting inertial tuning mass (26) to member (22), at least one, and preferably two, fluid chambers, (30) and (32), each having a defined volume stiffness Kv'1, Kv'2, a fluid (34) contained within the at least one and preferably two, fluid chambers, (30) and (32), a moveable piston (36) dynamically interacting with the fluid (34) in the at least one fluid chamber and preferably, in first and second fluid chambers, (30) and (32), to cause pressure variations which dynamically drive the primary tuning mass (23) within a range about the primary resonant frequency (fn1). Preferably, a coil (40) and magnet-and-pole assembly (38) driving the piston (36). The AVA (20) preferably includes a secondary resonance (fn2) which is tunable by adjusting the mass of the piston (36), volume stiffness Kv'1 of the first fluid chambers (30), and a piston area Ap1, amongst other parameters.

23 Claims, 5 Drawing Sheets

U.S. PATENT DOCUMENTS

| | | | |
|---|---|---|---|
| 5,344,128 | 9/1994 | Kobayashi et al. | 267/140.14 |
| 5,361,878 | 11/1994 | Borsati | 188/378 |
| 5,427,347 | 6/1995 | Swanson et al. | 248/550 |
| 5,427,362 | 6/1995 | Schilling et al. | 267/140.14 |
| 5,439,082 | 8/1995 | McKeown et al. | 188/379 |
| 5,452,884 | 9/1995 | Gugsch et al. | 267/140.14 |
| 5,779,231 | 7/1998 | Okazaki et al. | 267/140.14 |

OTHER PUBLICATIONS

Waterman et al., *"Fokker's Activities in Cabin Noise Control for Propeller Aircraft"*, SAE Technical Paper Series, #830736, Apr. 12–15, 1983.

Hagino et al., *"Active Control for Body Vibration of F.W.D. Car"*, SAE Technical Paper Series, #860552, Feb. 24–28, 1986.

FLUID-FILLED ACTIVE VIBRATION ABSORBER

FIELD OF THE INVENTION

This invention relates to devices for controlling dynamic vibrations of a member. Specifically, it relates to Active Vibration Absorbers (AVAs) for controlling vibration.

RELATED APPLICATIONS

This application for patent is related to application Ser. No. 08/835,433 entitled "Active Fluid Mounting" which is filed contemporaneously herewith.

BACKGROUND OF THE INVENTION

Passive Tuned Vibration Absorbers (TVAs), otherwise referred to as tuned absorbers, proof mass devices, or tuned inertial devices, include an inertial tuning mass suspended by a spring-like member. The mass of the tuning mass and stiffness of the spring-like member are "tuned" such that the TVA generally reduces vibration of a vibrating member at the attachment point and at its resonant natural frequency (fn). The disadvantage of passive TVAs is they are only effective at a particular disturbance frequency (fn) or within a very narrow frequency range (effective range) thereabouts. Furthermore, TVAs may be too massive for applications where weight considerations are paramount. Although, in some applications, TVAs provide excellent vibration reduction, in other applications where the disturbance frequency exposed to the vibrating member varies widely, a passive TVA may perform unacceptably. This is particularly true outside of the TVA's effective range. U.S. Pat. No. 3,490,556 to Bennett, Jr. et al. entitled "Aircraft Noise Reduction System With Tuned Vibration Absorbers" and U.S. Pat. No. 3,668,939 to Schrader entitled "Plane Omni-directional Absorber" are illustrative of passive TVAs for canceling vibration and/or noise. Further, SAE Paper 830736 to E. H. Waterman, D. Kaptein, and S. L. Sarin describes "Fokker's Activities in Cabin Noise Control for Propeller Aircraft" and describes passive absorbers attached to the fuselage frame. A similar paper by T. Bevan and R. Hund entitled "Vibration Absorbers Quiet Propeller Noise" describes passive vibration absorbers for reducing low frequency interior noise in Beech Aircraft.

When a wider frequency range of vibration cancellation is required, various adaptive controllable or multi-frequency TVAs have been employed. For example, U.S. Pat. No. 5,361,878 to Borsati entitled "Dynamic Two Frequency Vibration Damper" teaches a TVA which can be passively tuned to cancel vibrations at two different frequencies. U.S. Pat. No. 3,085,657 to Preis entitled "Variable Frequency Vibration Absorber" teaches a TVA where the position of the mass 14 on spring 10 can be adjusted via arm 16 to change the tuned natural frequency (fn) of the TVA. U.S. Pat. No. 3,430,902 to Lohr entitled "Variable Stiffness Polymeric Damper" teaches a TVA whose resonant frequency (fn) may be varied by controlling the temperature of the polymeric spring element 16 which has temperature dependent stiffness characteristics. Again, even adaptive controllable or multi-frequency devices may prove unacceptable in terms of performance or weight for some applications.

Where better vibration isolation or lower weight is desired, Active Vibration Absorbers (AVAs), otherwise referred to as inertial shakers, or active proof mass devices may be employed. AVAs include an active element that actively drives an inertial tuning mass through a wide range of frequencies and in various phase relationships to the disturbance. U.S. Pat. Nos. 5,427,362 to Schilling et al., U.S. Pat. No. 4,694,650 to Vincent, and U.S. Pat. No. 3,917,246 to Gartner et al. teach various AVA-like devices. U.S. Pat. Nos. 5,332,061 to Majeed et al., 5,310,137 to Yoerkie, Jr. et al., 5,251,863 to Gossman, and 4,715,559 to Fuller describe various systems where the AVA-like devices are useful. In particular, it is known to use AVA-like devices to cancel engine vibration in automobiles, to attach directly to the inside surface of the fuselage of an aircraft to cancel noise therein, to cancel high-frequency vibrations of a helicopter transmission, and to cancel vibrations in machinery.

U.S. Pat. No. 5,439,082 to McKeown et al., commonly assigned U.S. Pat. Nos. 5,427,347 to Swanson and 5,174,552 to Hodgson et al., and U.S. Pat. No. 5,067,684 to Garngost, describe active mountings/isolators for attachment between a vibrating member and a structure. These active mountings differ from AVAs in that they "attach between two elements" and provide active forces "between two elements" and, therefore, have two connection points. One connection is to structure and the other to the vibrating member. On the other hand, AVAs are inertial devices that only attach at a single point, i.e., at the point where the vibration is to be controlled and include an inertial tuning mass that is flexibly-suspended. AVAs include a tuned resonant frequency where the system is designed to be operated at, or near.

Commonly assigned U.S. Pat. No. 4,811,919 to Jones describes a volume compensator used in a fluid mounting for allowing expansion of fluid contained therein and for providing pressurization thereof.

U.S. Pat. No. 5,231,336 to van Namen, describes an actuator for active mountings which includes multiple coils which generate magnetic fields in opposition to one another when energized.

It should be understood that none of the afore-mentioned devices provide a compact and efficient AVA which has an internal means for driving a primary mass and which incorporate at least one fluid chamber including a volume stiffness and use fluid as an intermediate driving medium to drive said primary mass, and which include a primary resonance and preferably a secondary resonance which may be used to provide efficient control of vibration at multiple frequencies.

SUMMARY OF THE INVENTION

Therefore, in light of the advantages and drawbacks of the prior art, the present invention is a fluid-filled AVA for attaching to, and controlling vibration, of a member it is attached to. The fluid-filled AVA is comprised of a flexibly-suspended primary tuning mass, preferably including an additional inertial tuning mass which is tuned, along with other parameters, such that the fluid-filled AVA exhibits a primary resonant frequency (fn1), a flexible element, such as an elastomer section, for interconnecting the primary mass to the member, at least one fluid chamber, and preferably two fluid chambers, such as first and second fluid chambers, within the fluid-filled AVA, each having a volume stiffness (Kv) associated therewith, a fluid contained within, and substantially filling, the at least one, and preferably two, fluid chambers, a piston interacting with the fluid in the at least one fluid chamber, and preferably said first and said second fluid chambers, to cause pressure variations in the at least one fluid chamber (preferably first and second fluid chambers) to dynamically drive the primary mass, and means for driving the piston comprising, for example, the combination of a coil and magnet-and-pole assembly. The primary resonant frequency (fn1) is preferably tuned at or near a fundamental or primary disturbance frequency (fd1). The fluid-filled AVA preferably also exhibits a secondary resonant frequency (fn2) which may be tuned to at or near a second disturbance frequency (fd2). The second resonant frequency (fn2) is predominantly associated with the mass of the piston, the stiffness of the flexible element, and volume stiffness Kv of the at least one of the fluid chamber, and the piston and chamber areas, amongst other parameters.

It is an advantage of the present invention fluid-filled AVA that it does not include any sliding dynamic seals which have a tendency to wear out.

It is an advantage of the present invention fluid-filled AVA that it can be used to efficiently generate/absorb vibration at a plurality of frequencies, such as for example, a fundamental and harmonic frequency of an engine.

It is an advantage of the present invention fluid-filled AVA that its multiple resonances exhibited may be precisely tuned to resonate at multiple resonant frequencies, thereby making the device more efficient at or near those resonant frequencies.

The abovementioned and further features, advantages and characteristics of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings.

DETAILED DESCRIPTION OF THE INVENTION

Figure 1A:
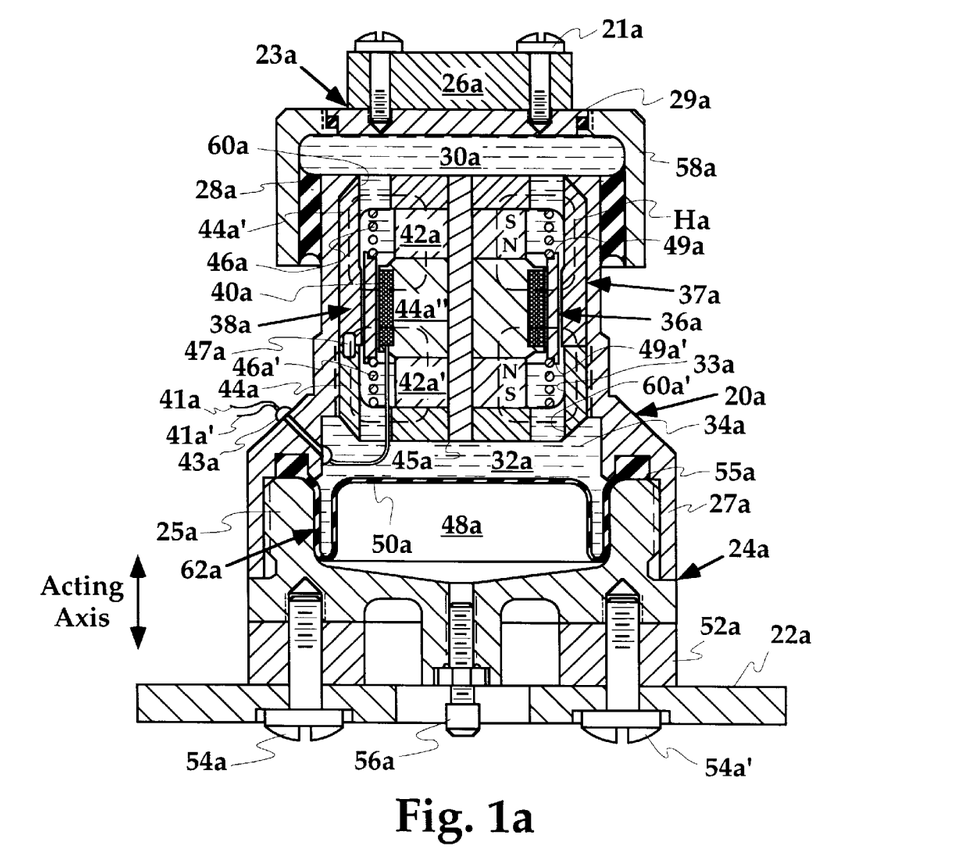
FIG. 1a is a cross-sectioned side view of a first embodiment of the present invention fluid-filled AVA which includes an inductively-driven piston.

Referring now to the Drawings where like numerals denote like elements, in FIG. 1a, shown generally at 20a, is a first embodiment of the present invention fluid-filled AVA. The AVA 20a is dynamically driven, via control signals preferably processed in a digital electronic controller (not shown). The vibration of the AVA 20a is controlled according to predetermined criteria, and preferably according to an adaptive control algorithm, which receives various control inputs, such as an error signal(s) and/or a reference signal(s). The AVA 20a then "controls" the vibration at the attachment point to the member 22a. Control may be accomplished in a feedback or feedforward fashion. By the term "controlled", it is meant that the vibration can be either "reduced" or "increased" at the attachment point, depending upon the desired control result. It should also be understood that the member 22a may be a structural element exposed to vibration, such as an aircraft, automobile, machine structure, body, frame, or the like, or a vibrating motive element which includes a rotational unbalance, such as a vehicle engine, electric motor, or the like.

The fluid-filled AVA 20a is comprised of a primary tuning mass 23a preferably including a detachable additional inertial tuning mass 26a. The primary mass 23a is flexibly-suspended, and interconnected to the member 22a by a flexible element 28a, or other like spring-like element, such as the elastomeric annular-shaped tube-form element shown. The optional intermediate member 58a, which includes a sealed fill plug 29a, is included within the mass M1 of the primary mass 23a and functions to interconnect additional inertial tuning mass 26a to flexible element 28a. It should be understood that primary mass 23a is comprised of additional tuning mass 26a, intermediate member 58a, plug 29a, and fasteners 21a.

The mass/weight of primary tuning mass 23a, the axial stiffness of the flexible element 28a, and/or the volume stiffness of the first fluid chamber 30a, amongst other parameters, are appropriately adjusted, such that the primary resonant frequency fn1 of the fluid-filled AVA 20a, which acts along its acting axial axis, is tuned to substantially coincide with a predominant or primary disturbance frequency fd1. The primary disturbance frequency fd1 (which may vary within a small range) may comprise, for example, a fundamental disturbance frequency of an engine, or the like. Preferably, fn1 would be tuned to the low end of the fd1 range. This is because the roll off (slope) on the right side of the first resonant frequency fn1 is more gentle than on the left (See FIG. 8). Easy adjustment of the primary tuning mass 23a is accomplished by changing out additional inertial tuning mass 26a. Adjustment of the flexible element 28a and dynamic volume stiffness Kv'1 can be accomplished by re-bonding the elastomer tube-form section. Preferable elastomer materials for bonding any and all elastomer sections described in all embodiments herein include natural rubber, synthetic rubber, blends of natural and synthetic rubber, silicone, and the like. The AVA 20a preferably attaches to the member 22a via housing 24a and fasteners 54a, 54a'. Likewise, an optional spacer 52a may be desirable.

The AVA 20a, further includes at least one fluid chamber, and preferably, two fluid chambers, such as first and second fluid chambers 30a, 32a which are preferably located internally, each exhibiting a "defined" dynamic volume stiffness Kv'. By the term "defined volume stiffness" Kv', it is meant that when all passages to and from each individual fluid chamber are theoretically blocked off, and the piston is held stationary, an increase in pressure will cause an increase in volume within the individual fluid chamber. Furthermore, the term "defined" also indicates that the volume stiffness Kv' is preferably tuned. It should be noted that fluid chambers that have a flexible compliance associated therewith, such as an elastomer element, will exhibit a volume stiffness Kv'. Contrawise, sliding pistons received within chambers are substantially non-compliant and are considered as being substantially infinitely stiff.

It should be also noted, that for all the fluid-filled AVAs described herein that include two fluid chambers, it is preferable that the dynamic volume stiffness Kv'1 of the first fluid chamber, such as 30a, be substantially higher (a factor of 10 or more) than the dynamic volume stiffness Kv'2 of the second fluid chamber 32a. This allows efficient dynamic pressurization of the first fluid chamber (ex. 30a) as the second fluid chamber (ex. 32a) offers little resistance to movement of the piston (ex. 36a). A fluid 34a, which is preferably substantially incompressible, sufficiently dense, and preferably electrically nonconductive, such as a perfluorinated polyether, silicone fluid, or the like, is contained within, and substantially fills, the first and second fluid chambers 30a, 32a and any passages therebetween and functions as the working fluid within the AVA 20a.

The AVA 20a further comprises a piston 36a which includes a piston area Ar (pumping area at the terminal ends), which is preferably annular-shaped and which dynamically and fluidically interacts with the fluid 34a contained in the first and second fluid chambers 30a, 32a thereby causing pressure variations therein. These pressure variations dynamically drive the primary tuning mass 23a. Means for driving the piston 36a preferably includes a coil 40a and a magnet-and-pole assembly 38a which is comprised of at least one permanent magnet, and more preferably, two permanent magnets, such as ring magnets 42a, 42a' and pole pieces, 44a, 44a', 44a".

The secondary tuning mass Mt is comprised partially of mass of the piston 36a, which is preferably centered and precompressed by centering springs 46a, 46a'. In this embodiment, the piston 36a is preferably cylindrical and annular-shaped and is manufactured from a highly electrically conductive (yet nonmagnetic) material, such as copper or brass, and is inductively driven by the coil 40a. Thus, the terminal end portions 49a, 49a' (defining the pumping piston area Ar) fluidically interacts with the fluid 34a contained in first and second fluid chambers 30a, 32a via fluid ports 60a, 60a'. The piston 36a is preferably included and housed within a third chamber 33a. By the terms "fluidically interact", it is generally understood that fluid 34a will be pumped to and from the third chamber 33a and into and out of the first and second fluid chambers 30a, 32a through ports 60a, 60a'. Preferably, the ports 60a, 60a' will have low fluid inertia. However, it should be understood that the fluid inertia If of the fluid 34a in ports 60a, 60a' could be tuned to add additional mass to secondary mass Mt.

It should also be understood that the area of action (pumping area) of the piston area Ar located at the terminal end portions 49a, 49a' of the inductively-driven piston 36a is preferably significantly smaller than the projected piston area Ap of the first and second fluid chambers, 30a and 32a. Therefore, the forces generated by driving the piston 36a can be significantly amplified, i.e., fluidically leveraged. Preferably, in this embodiment including an inductively-driven piston 36a, the amplification ratio or mechanical advantage MA is given by the approximate relationship:

$$MA = Ap1/Ar \qquad \text{Eqn. 1}$$

where:
   MA is the mechanical advantage,
   Ap1 is the pumping area of the first fluid chamber 30a in (in$^2$) or (m$^2$), and Ar is the pumping area of the piston 36a in (in$^2$) or (m$^2$).

The mechanical advantage MA for this inductively-driven embodiment should preferably be large. In this fashion, the bandwidth of the motor unit 37a is increased. Preferably, Ap1 and Ap2 are approximately equal in area. However, if the volume stiffness of the second fluid chamber 32a is very low (Kv2<<Kv1), then the size of Ap2 is insignificant.

In the AVA 20a, the coil 40a and magnet-and-pole assembly 38a are included within a drop-in, unitary motor unit 37a. The motor unit 37a is an integral and cartridge-like unit which can be readily and easily changed out. For example, the alternate drop-in motor unit 37a' shown in FIG. 1b could be quickly interchanged to test an alternate motor concept or the alternate motor unit 37a' may be required for a different application, in that it may be tuned differently (have a different secondary mass Mt, piston area Ar, or centering spring stiffness Ks), thereby allowing the use of a common housing 24a.

Again referring to FIG. 1a, the motor unit 37a is received in a hollow pocket formed in the housing 24a and is preferably comprised of two opposed and inverted disc-like permanent magnets 42a, 42a' which produce opposed static, i.e., standing magnetic fields, a non-magnetic alignment rod 45a over which all the other components are preferably press fit, a sleeve-like nonmagnetic, yet conductive, piston 36a, centering springs 46a, 46a' supporting and centering the piston 36a, a wound coil 40a, pole pieces, 44a, 44a', 44a" for directing the magnetic flux, and a locator pin 47a for properly rotationally aligning the components. A portion of the symmetrical magnetic field Ha is approximated by dotted lines of flux shown. Electrical leads 41a, 41a' provide electrical current to the wound coil 40a. Leads 41a, 41a' are enclosed in a casing which is sealed via hermetic seal 43a, such as a potting material, sealed electrical connector, bonded seal, or the like.

Wound coil 40a is preferably manufactured from a copper magnet wire of the appropriate size and number of winds to produce a dynamic magnetic field of an acceptable dynamic flux density. In operation, the dynamic magnetic field interacts with the standing magnetic field generated by permanent magnets 42a, 42a'. Permanent magnets 42a, 42a' preferably have N and S poles oriented as shown in FIG. 1a or, alternately, in FIG. 1b, and are preferably Neodymium-type or other high-strength rare-earth permanent magnets. The permanent magnets 42a, 42a' cause a static magnetic flux to be generated within the gap (the gap is filled by the piston 36a and wound coil 40a) and generates lines of flux that act radially across the gap, as illustrated by magnetic field Ha (FIG. 1a) and Ha' (FIG. 1a).

Moreover, energizing the wound coil 40a with an alternating current causes (induces) an electrical current to flow in the "hoop" direction about the electrically-conductive piston 36a because of the close proximity of piston 36a and wound coil 40a. This oscillating induced current (above a break frequency) in the piston 36a creates a dynamically oscillating magnetic field which interacts with the static magnetic flux created by permanent magnets, 42a, 42a' and the dynamic flux created by coil 40a. This interaction causes the piston 36a to be driven axially (along the acting axis). It should be noted, that regardless of the direction or axial location of the piston 36a relative to the wound coil 40a, a force can be generated to either assist or retard the motion of piston 36a.

Figure 8:
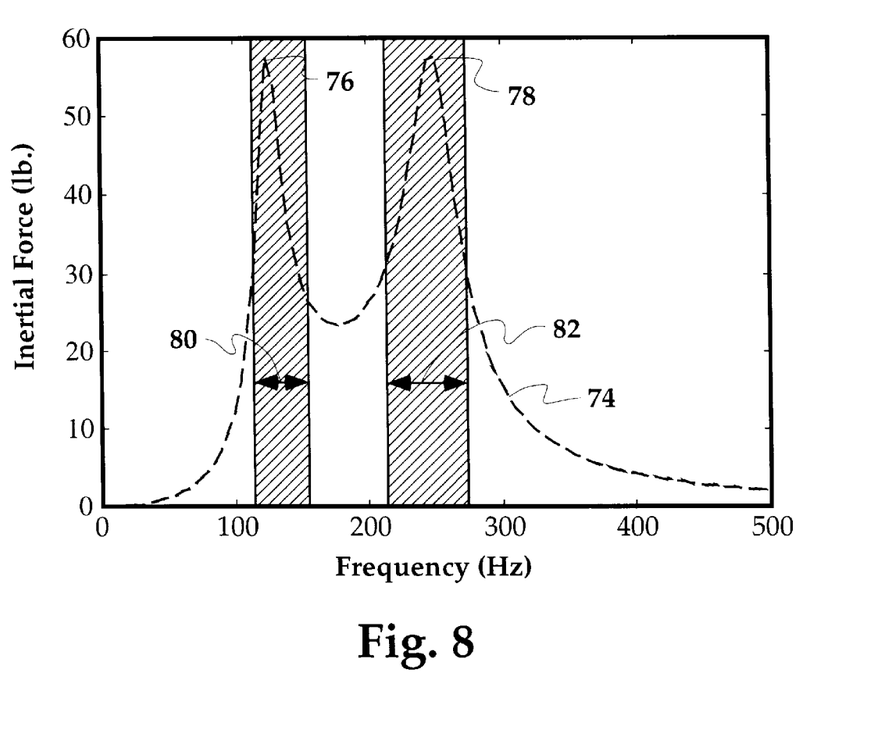
FIG. 8 is a hypothesized performance curve for a representative fluid-filled AVA.

It should also be understood that the mass of piston 36a, pumping area Ap1 of the first chamber 30a, area of the piston Ar, inertia of the fluid If, volume stiffness Kv of first fluid chamber, and axial stiffness and mass of centering springs 46a, 46a' may be appropriately tuned, amongst other parameters, such that the piston 36a resonates at a secondary resonant frequency fn2 (to be fully described later herein). This secondary resonant frequency fn2 preferably substantially coincides with the secondary disturbance frequency fd2 (example: a second engine frequency, harmonic, or the like, but which may also comprise a small range). Preferably fn2 would be tuned to the high end of the fd2 range as shown in FIG. 8. Likewise, the primary resonant frequency fn1 may be tuned as heretofore described, such that fn1 substantially coincides with a primary or fundamental disturbance frequency fd1, such as an N1 shaft rotational frequency of an aircraft engine or a fundamental frequency of an automotive engine.

The approximate uncoupled primary resonant frequency fn1 of the AVA 20a may be roughly approximated by the relationship:

$$fn1 = \{½π\}\{[Ka + Kv'1Ap1^2]/M1\}^{1/2} Hz \text{ or } (1/s) \quad \text{Eqn. 2}$$

where:
- fn1 is the primary resonant frequency in (Hz) or (1/s),
- Ka is the dynamic axial stiffness of flexible element 28a in (lbf/in) or (N/m),
- Kv'1 is the dynamic volume stiffness of first fluid chamber 30a in (psi/in$^3$) or (pascal/m$^3$),
- Ap1 is the pumping (piston) area of first fluid chamber 28a in (lbf/in) or (N/m), and
- M1 is the mass of primary tuning mass 23a in (Lbf-s$^2$/in) or (Kg).

It should also be noted that this rough approximation only holds true when fn1 and fn2 (to be described later) are appropriately spaced and when the following simplifying assumptions can be made.

Assumptions:

$$Kv'_1 Ap_1 Ar \text{ is negligible} \quad \text{Eqn. 3}$$

$$Ca = 0 \quad \text{Eqn. 4}$$

where:
- Kv'$_1$ is the dynamic volume stiffness of the first fluid chamber 30a in (psi/in$^3$) or (N/m$^6$),
- Ap$_1$ is the pumping area of the first fluid chamber 30a in (in$^2$) or (m$^2$),
- Ar is the pumping area of piston 36a in (in$^2$) or (m$^2$), and
- Ca is the damping factor of the flexible member 28a in (lbf-s/in) or (N-s/m).

These assumptions will hold true, in the majority of cases, where the MA ratio is large and where the flexible member 28a is lightly damped elastomer. A more exact approximation for fn1 and fn2 can be obtained by solving for the eigenvalues of the coupled system as described below (See Eqn. 17).

The performance of this embodiment of AVA 20a is dictated by the current Ir that is induced into the inductive-ring piston 36a. The following equations can be used to size, for example, AVA 20a including an inductively-driven piston 36a. It should be understood that the equations are exemplary only, and not to be considered limiting. The force Fp acting to drive the piston 36a is given by the approximate relationship:

$$F_p = α_m * I_c (Lbf) \text{ or } (N) \quad \text{Eqn. 5}$$

where:

$α I_m$ is the force constant in (Lbf/Amp) or (N/Amp), and
$I_c$ is the electrical current in the wound coil 40a in (Amp).
$α_m$, the force constant, is given by the approximate relationship:

$$α_m = B_g 0.0057 \frac{I_r}{I_c} π \left\{ \frac{ID_r + OD_r}{2} \right\} (Lbf/Amp) \quad \text{Eqn. 6}$$

where:
- Bg is flux density in the gap in (Tesla),
- Ir is the current induced in the piston 36a in (Amp),
- $I_c$ is the electrical current in the wound coil 40a in (Amp),
- IDr is the inside diameter of piston 36a in (in), and
- ODr is the outside diameter of piston 36a in (in).

The current Ic flowing in the wound coil 40a induces current Ir to flow in the piston 36a in the hoop direction, well above the break frequency, according to the approximate relation:

$$I_r = \frac{I_c N_c E_{rc}}{1} (Amp) \quad \text{Eqn. 7}$$

where:
- $I_c$ is the electrical current in the wound coil 40a in (Amp),
- $N_c$ is the total number of turns in the wound coil 40a, and
- $E_{rc}$ is the coupling efficiency of piston 36a and coil 40a.

The flux density Bg in the gap is given by the approximate relationship:

$$B_g = \left\{ \frac{B_r}{\frac{σA_g}{A_m} + \frac{υ_r f L_g}{L_m}} \right\} (Tesla) \quad \text{Eqn. 8}$$

where σ is given by the approximate relation:

$$σ = \frac{A'_g}{A_g} \quad \text{Eqn. 9}$$

where:
- Bg is the flux density in the gap in (Tesla),
- Br is the remnant flux density in (Tesla),
- σ is a factor related to magnetic leakage,
- Ag is the area of the magnetic gap in (in$^2$) or (m$^2$),
- $A_m$ is the permanent magnet area in (in$^2$) or (m$^2$),
- $υ_r$ is the recoil permeability related to the pole piece material,
- f is the magnet operating factor,
- $L_g$ is the length of gap magnetic flux must jump in (in) or (m),
- $L_m$ is the length of magnet in poled direction in (in) or (m), and
- A'g is the area of magnetic gap accounting for leakage losses in (in$^2$) or (m$^2$).

Given all the above, the maximum driving force Fa acting to drive the primary mass 23a is approximated by:

$$Fa = MAFp = MAα_m Ic (Lbf) \text{ or } (N) \quad \text{Eqn. 10}$$

However, the maximum force Fa that can be achieved for continuous operation will generally be limited by temperature considerations. In other words, to prevent overheating of the AVA 20a, the current Ic supplied to the coil 40a must be limited somewhat. However, it should be understood that the actual force produced to control vibration of the member 22a can be significantly amplified by the resonant effects brought about by tuning of the resonances fn1, fn2 to amplify the output forces at the disturbance frequencies fd1, fd2.

The dynamic volume stiffness $Kv'_1$, of the first fluid chamber 30a of the AVA 20a is given by the approximate relation:

$$K_{v'_1} = \frac{1}{\frac{V_f}{B_f} + \frac{t^3\pi(ID_t + t)}{8G'L_t}} \quad (\text{psi/in}^3) \text{ or } (\text{N/m}^6) \qquad \text{Eqn. 11}$$

where:

$Kv'_1$ is the dynamic stiffness of the first fluid chamber 30a in $(\text{psi/in}^3)$ or $(\text{N/m}^6)$, Vf is the volume of fluid 34a contained in the first fluid chamber 30a in $(\text{in}^3)$ or $(\text{m}^3)$, $B_f$ is the bulk modulus of the fluid 34a in first fluid chamber 30a in $(\text{lbf/in}^2)$ or $(\text{N/m}^2)$, t is the thickness of tube-form elastomer 28a in (in) or (m), $ID_t$ is the inner diameter of tube-form elastomer 28a in (in) or (m), $G'$ is the dynamic shear modulus of the elastomer used in $(\text{lbf/in}^2)$ or $(\text{N/m}^2)$, and $L_t$ is the length of the annular tube-form elastomer 28a in (in) or (m).

The weight Wr of the piston 36a is approximately given by:

$$W_r = \rho_{wd} H_r \frac{\pi}{4}(OD_r^2 - ID_r^2) \quad (\text{Lbf}) \text{ or } (\text{N}) \qquad \text{Eqn. 12}$$

where:

$\rho_{wd}$ is the density of material in piston 36a in $(\text{Lbf/in}^3)$ or $(\text{N/m}^3)$, $H_r$ is the height of the piston 36a in (in) or (m), $OD_r$ is the outside diameter of the piston 36a in (in) or (m), and $ID_r$ is the inside diameter of inductive-ring piston 36a in (in) or (m).

The fluid inertia Ifp in the flow ports 60a, 60a' located between the piston 36a and the first and second fluid chambers 30a, 32a is included in the secondary tuning mass Mt and should be considered in all dynamic calculations (although it may be made negligible through appropriate sizing of the ports 60a, 60a'). The fluid inertia Ifp is dependent on the diameter d of the ports 60a, 60a', their length Lport, their number Nports, and the density ρf of the fluid 34a and is given by the approximate relations:

$$I_f = \frac{\rho_f L_{port}}{gA_{port}} \quad (\text{lbf-s}^2/\text{in}^5) \text{ or } (\text{N-s}^2/\text{m}^5) \qquad \text{Eqn. 13}$$

and $$A_{port} = N_{ports}\frac{\pi}{4}d^2 \quad (\text{in}^2) \text{ or } (\text{m}^2) \qquad \text{Eqn. 14}$$

where:

If is the fluid inertia in ports 60a, 60a' in $(\text{Lbf-s}^2/\text{in}^5)$ or $(\text{N-s}^2/\text{m}^5)$, $\rho_f$ is the fluid density of the fluid in ports 60a, 60a' in $(\text{Lbf/in}^3)$ or $(\text{N/m}^3)$, $L_{port}$ is the combined length of ports 60a, 60a' connecting first and second fluid chambers, 30a, 32a, to the piston 36a in (in) or (m), g is the gravitational constant in $(\text{in/s}^2)$ or $(\text{m/s}^2)$, $A_{port}$ is the cross-sectional area of ports 60a, 60a' in $(\text{in}^2)$ or $(\text{m}^2)$, $N_{port}$ is the total number of fluid ports 60a, 60a' per end, and d is the diameter of fluid ports 60a, 60a' in (in) or (m).

As mentioned above, the secondary resonant frequency fn2 of the piston 36a is preferably placed (tuned), amongst other factors, such that fn2 substantially coincides with the secondary disturbance frequency fd2. For example, this could be an N2 shaft rotation frequency of an aircraft engine, or a higher harmonic of an automobile engine. The following approximate relation approximates undamped and uncoupled secondary resonant frequency fn2 of the piston 36a.

$$fn2 = \tfrac{1}{2}\pi\{(Kv'1Ap1^2/Mt)\,(Ar/Ap1)^2\}^{1/2}(\text{Hz}) \text{ or } (1/s), \qquad \text{Eqn. 15}$$

and $$Mt = Ifp(Ar^2) + \{(Ws+Wr)/g\}(lbf\text{-}s^2/\text{in}) \text{ or } (\text{Kg}). \qquad \text{Eqn. 16}$$

Assumptions:
Cs=0,
$Kv'1Ap_1^2 >> Kv'2Ap_2^2$
and
$Ks << Kv'1Ar^2$

These assumptions will generally hold true when Kv'2 is much softer that Kv'1, such as when a rolling diaphragm is used to provide the compliance in the second fluid chamber 32a and when the centering springs 49a, 49a' are lightly sprung.

where:

fn2 is the secondary resonant frequency of piston 36a in (Hz) or (1/s), $Kv'_1$ is the dynamic stiffness of the first fluid chamber 30a in $(\text{psi/in}^3)$ or $(\text{N/m}^6)$, $A_{p1}$ is the area of first fluid chamber 30a in $(\text{in}^2)$ or $(\text{m}^2)$, Mt is the mass of the secondary mass in $(\text{Lbf s}^2/\text{in})$ or (Kg), $I_{fp}$ is the fluid inertia in all ports 60a, 60a' in $(\text{lbf-s}^2/\text{in}^5)$ or $(\text{N-s}^2/\text{m}^5)$, $W_s$ is the active weight of centering springs 46a, 46a' in (Lbf) or (N), and $W_r$ is the weight of piston 36a in (Lbf) or (N).

The best performance for this type of AVA 20a is obtained when the predominant disturbance frequencies, fd1 and fd2, substantially coincide with the primary resonant frequency fn1 and/or secondary resonant frequency fn2, or both, and it should be understood that the AVA 20a is very efficient when operated at those frequencies as is demonstrated by FIG. 8.

More precise equations representing the location of the resonant frequencies f21, fn2 may be obtained by setting S=jω, setting Det=0, and solving the following equation using a computer program.

$$Det=\{[Ka+Kv_1Ap_1^2][Ks+(Kv_1Ap_1^2+Kv_2Ap_2^2)(Ar^2/Ap_1^2)]-Kv_1Ap_1^2Ar^2\}+S\{Ca(Ks+(Kv_1Ap_1^2+Kv_2$$

$$Ap_2^2)(Ar^2/Ap_1^2)+Cs(Ka+Kv_1Ap_1^2)\}+S^2\{M1(Ks+(Kv_1Ap_1^2+Kv_2Ap_2^2)(Ar^2/Ap_1^2)+Mt(Ka+Kv_1Ap_1^2)+CaCs\}+S^3\{M1Cs+MtCa\}+S^4\{M1Mt\}. \quad \text{Eqn. 17}$$

AVA EXAMPLE

The following parameters are exemplary of those that would be used for the AVA 20a shown in FIG. 1a with fn1 tuned to about 129 Hz (129 1/s) and fn2 is tuned to about 248 Hz (248 1/s). These values are provided for example only and are not to be considered limiting.

Ka is the axial dynamic stiffness of flexible element 28a (1,000 Lbf/in) or (175,126 N/m), Ks is the total axial dynamic stiffness of centering springs 46a, 46a' in (80 Lbf/in) or (14,010 N/m), M1 is the mass of the primary tuning mass 23a in (5.2 E-3 Lbf s$^2$/in) or (0.907 Kg), Mt is the mass of the secondary mass including mass of piston 36a, fluid 34a, and active portion of centering springs 46a, 46a' combined in (7.76 E-5 Lbf s$^2$/in) or (1.36 E-2 Kg), $I_{fp}$ is the fluid inertia in all ports 60a, 60a' in (4.92 E-5 lbf-s$^2$/in$^5$) or (2.07 E-6 N-s$^2$/cm$^5$), $W_s$ is the total weight of centering springs 46a, 46a' in (4.97 E-3 Lbf) or (0.022 N), $W_r$ is the weight of piston 36a in (0.0237 Lbf) or (0.0985 N), $A_r$ is the pumping area of piston 36a in (0.07 in$^2$) or (455 mm$^2$), $A_{p1}$ is the area of first fluid chamber 30a in (0.8 in$^2$) or (516 mm$^2$), $A_{p2}$ is the area of second fluid chamber 30a in (2.0 in$^2$) or (1,290 mm$^2$), $\rho_f$ is the fluid density of the fluid in ports 60a, 60a' in (0.064 Lbf/in$^3$) or (17.34 N/m$^3$)

$L_{port}$ is the length of each port 60a, 60a' connecting first and second fluid chambers, 30a, 32a, to the piston 36a in (0.20 in) or (5.08 mm), $N_{port}$ is the number of fluid ports 60a, 60a' (approx. 6 per end), and d is the diameter of fluid ports 60a, 60a' in (0.125 in) or (3.17 mm).

$Kv'_1$ is the dynamic volume stiffness of the first fluid chamber 30a in (10,000 psi/in$^3$) or (93,070 Pascals$^3$), and $Kv'_2$ is the dynamic volume stiffness of the second fluid chamber 32a in (463 psi/in$^3$) or (199 Pascal/m$^3$).

The fluid-filled AVA 20a preferably also includes a volume compensator 62a which preferably includes a flexible partition 50a, a charge chamber 48a, and a fill valve 56a. The flexible partition 50a is preferably a fabric-reinforced rolling elastomeric diaphragm which includes a periphery seal 55a which is axially compressed upon assembly of the threaded cap 25a into the body 27a of the housing 24a. The charge chamber 48a is filled with a compressible fluid, such as air or nitrogen, to a predetermined positive pressure of about 10–100 psi. This minimizes cavitation of the fluid 34a at certain frequencies and amplitudes when the piston 36a is dynamically actuated (driven). Further, the volume compensator 62a allows thermal expansion of the fluid 34a due to changes in temperature, thereby minimizing any pressure buildup in the AVA 20a which may effect stability and performance.

Figure 1B:
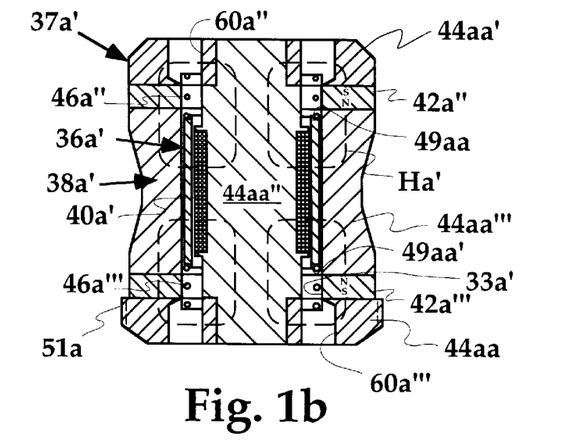
FIG. 1b is a cross-sectioned side view of a drop-in motor unit used in the fluid-filled AVA.

FIG. 1b illustrates another drop-in motor unit 37a' which comprises, in an alternate form, pole pieces 44aa, 44aa', 44aa'', 44aa''', permanent magnets 42a'', 42a''', centering coil springs 46a'', 46a''', and fluid ports 60a'', 60a'''. It should be understood that the drop-in motor unit 37a', as does 37a (FIG. 1a), preferably includes the entire magnetic circuit within it. In operation, the piston 36a' is inductively driven by energizing the wound coil 40a' which generates a dynamic magnetic field which interacts with the static field created within the magnet-and-pole assembly 38a' to cause fluid to be pumped into and out of third chamber 33a' by the terminal end portions 49aa, 49aa', of piston 36a'. The various high magnetic permeability pole pieces 44aa, 44aa', 44aa'', 44aa''' and permanent magnets 42a'', 42a''', make up the magnetic circuit and carry the magnetic flux. The motor unit 37a' is assembled by aligning all components with the inner pole piece 44aa'' and preferably press fitting pole pieces 44aa, 44aa' on the ends. Threads 51a are used to position and secure the motor unit 37a' into the pocket formed in the body 27a (FIG. 1a) of housing 24a. A portion of the standing magnetic field showing the lines of flux is approximated by dotted lines Ha'.

Figure 2:
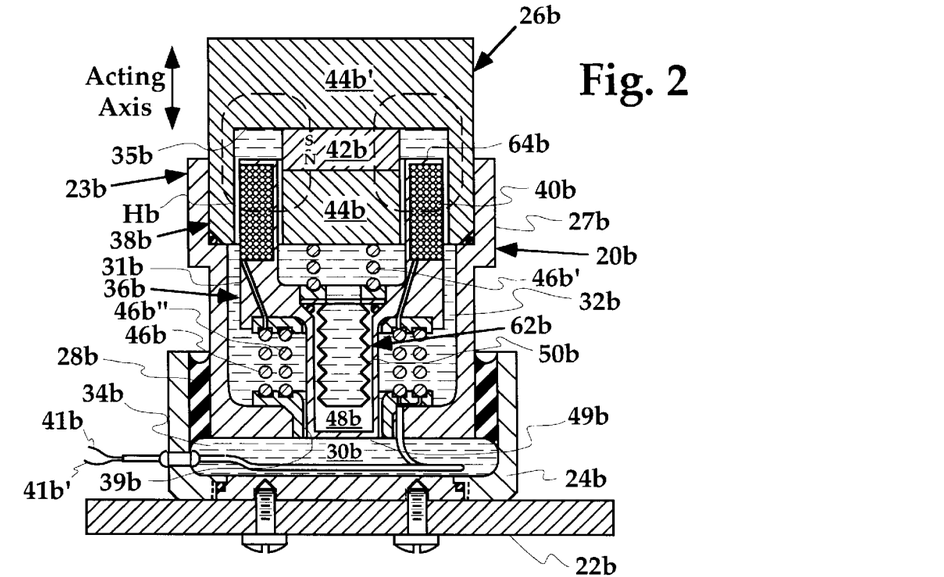
FIG. 2 is a cross-sectioned side view of another embodiment of fluid-filled AVA which includes a piston assembly received in a bore and having a coil wound about a lower portion.

FIG. 2 illustrates another AVA 20b for attachment to a member 22b by way of housing 24b. This AVA 20b is also comprised of a primary tuning mass 23b preferably including an additional inertial tuning mass 26b. The primary tuning mass 23b is flexibly suspended by flexible element 28b, such annular-shaped elastomer tube-form shown which is flexed axially, preferably in pure shear, upon oscillating the primary tuning mass 23b, and a movable piston 36b which interacts with the fluid 34b contained within, and substantially filling, the first and second fluid chambers 30b, 32b, to cause pressure variations therein. The mass of the piston 36b, fluid inertia Ifp, first chamber piston area Ap1, piston area Ar, axial stiffness of flexible element 28b, and dynamic volume stiffness Kv of the first flexible element 28b are tuned, amongst other parameters, to determine a secondary frequency fn2. The means for driving the piston 36b, is preferably a coil 40b and magnet-and-pole assembly 38b. The piston 36b is also preferably centered and flexibly supported by centering springs 46b, 46b', 46b'' which are preferably lightly sprung and do not significantly effect fn2.

In this embodiment, the coil 40b is comprised of a wound wire which is hoop wound about a bobbin 64b. The magnet-and-pole assembly 38b is comprised of a single disk-shaped permanent magnet 42b, and pole pieces 44b, 44b''. The piston 36b is included in an assembly which is comprised of bobbin 64b, wound coil 40b, and piston body 31b, and is received within a recess 35b formed in the magnet-and-pole assembly 38b. Notably, the magnet-and-pole assembly 38b also functions as the additional inertial tuning mass 26b in this embodiment. It should be understood that the flexibly suspended primary mass 23b preferably includes the additional inertial tuning mass 26b and housing body 27b. Further, in this embodiment, the secondary tuning mass is partially made up of piston 36b. A rod-like extension or protrusion from the piston 36b including a terminal end portion 49b is closely and slidably received within a bore 39b formed in body 27b, such that there is little dynamic flow of fluid 34b which occurs around the rod-like protrusion of piston 36b. Therefore, driving the piston 36b, efficiently creates dynamic pressure variations within first fluid chamber 30b.

The electrical current driving the AVA 20b is received through electrical leads 41b, 41b'. The incoming current path is through inner centering spring 46b", while the outgoing path is through outer centering spring 46b. The use of the terms "incoming" and "outgoing" are merely illustrative, as it should be understood that dynamically alternating current would preferably be applied. Carrying electrical current through the springs (coils), prevents fatigue of the leads to the moving wound coil 40b. Commonly assigned U.S. Pat. No. 5,323,133 to Heath et al. describes a "Method and Apparatus for Making Electrical Connection with a Moveable Member." The AVA 20b also preferably includes a volume compensator 62b including air chamber 48b and a flexible partition 50b, which is preferably a steel bellows or the like. The bellows preferably provides the volume stiffness Kv'2 for second fluid chamber 32b as well as allowing for expansion of fluid 34b.

The primary and secondary resonant frequencies fn1, fn2 of the AVA 20b are preferably tuned by adjusting the secondary tuning mass Mt, via adjusting the masses of the piston 36b which comprises the wound coil 40b, bobbin 64b, and piston body 31b, and secondary stiffnesses including stiffness of centering springs 46b, 46b', 46b", the dynamic axial stiffness of the first flexible element 28b, and dynamic volume stiffness Kv'1 of the first flexible element 28b, amongst other factors. Further, tuning is accomplished by adjusting the primary tuning mass M1 including the additional inertial tuning mass 26b (further including permanent magnet 42b and pole pieces 44b, 44b') and, body 27b. It should be understood that all of the above will effect, to some degree the position of the primary and secondary resonances fn1, fn2. The tuning may be approximated by the Eqn. 2 and Eqn. 15 above-described.

Figure 3:
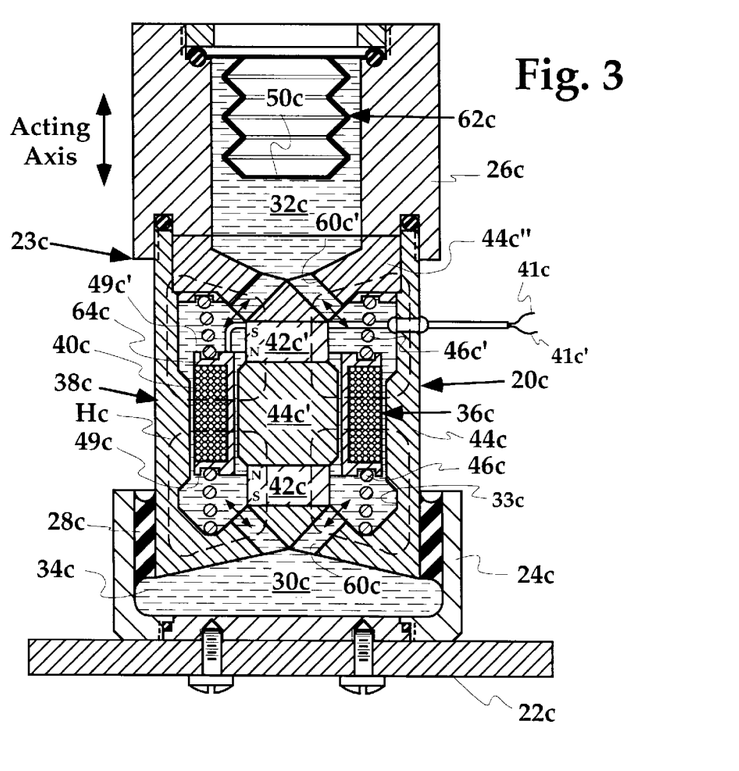
FIG. 3 is a cross-sectioned side view of another fluid-filled AVA where the piston comprises a moveable and annular-shaped coil and bobbin assembly.

In FIG. 3, the AVA 20c is functionally similar to the AVA of FIG. 2 whereby housing 24c attaches to the member 22c in a similar manner. The key difference is that the wound coil 40c and bobbin 64c together comprise the piston 36c. The piston 36c is centered by preferably precompressed centering springs 46c, 46c'. Magnet-and-pole assembly 38c is comprised of permanent disc-type magnets 42c, 42c', and pole pieces 44c, 44c', 44c". The terminal end portions 49c, 49c' of piston 36c interact with the fluid 34c in the intermediate chamber 33c and pumps fluid 34c into and out of first and second fluid chambers 30c, 32c through the plurality of ports 60c, 60c'. In this embodiment, additional inertial tuning mass 26c threads onto pole piece 44c. A flexible partition 50c, preferably a metal bellows, provides the volume stiffness Kv'2 for second fluid chamber 32c and also functions as the volume compensator 62c.

Although, this AVA 20c doesn't include a pressurized chamber (gas charge), the axial stiffness of flexible partition 50c may provide some pressurization to the fluid 34c to prevent cavitation. The primary mass 23c is flexibly suspended by flexible element 28c and is comprised of additional inertial tuning mass 26c, high magnetic permeability pole pieces 44c, 44c', 44c", and disc-shaped permanent magnets 42c, 42c'. The secondary mass Mt is comprised of the mass of wound coil 40c, mass of the bobbin 64c, masses of portions (approximately half) of centering coil springs 46c, 46c', and the mass of the fluid 34c contained in the plurality of ports 60c, 60c'. The magnetic circuit is included within the pole pieces 44c, 44c', 44c", and permanent magnets 42c, 42c'. The symmetrical portion of the lines of flux of a portion of magnetic field Hc are illustrated as dotted lines. Current is provided via leads 41c, 41c'. A strain relief loop (not shown) in the electrical wire may be used to reduce stress in the connection to the coil 40c.

Figure 4:
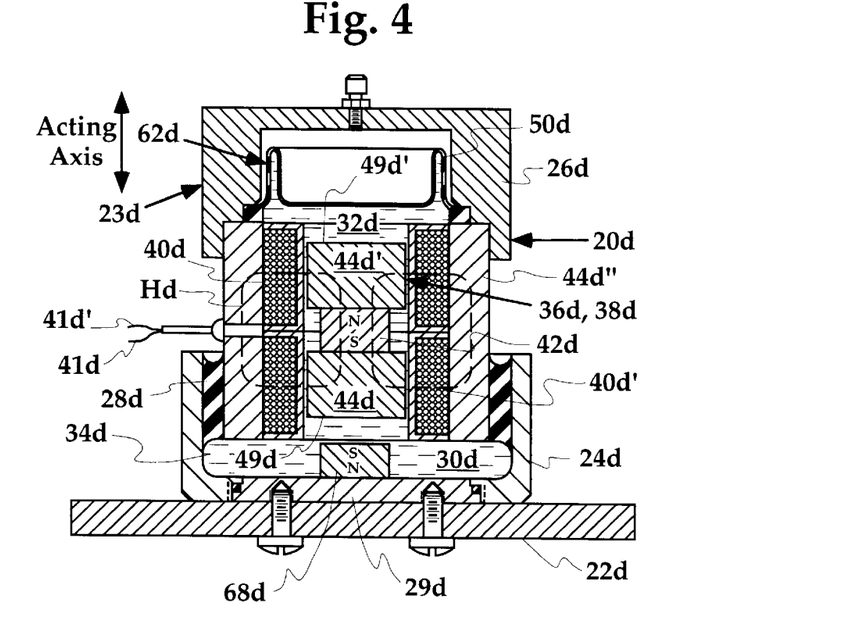
FIG. 4 is a cross-sectioned side view of another fluid-filled AVA that eliminates the need for centering springs and includes a ferro-fluid as the working fluid.
Figure 5:
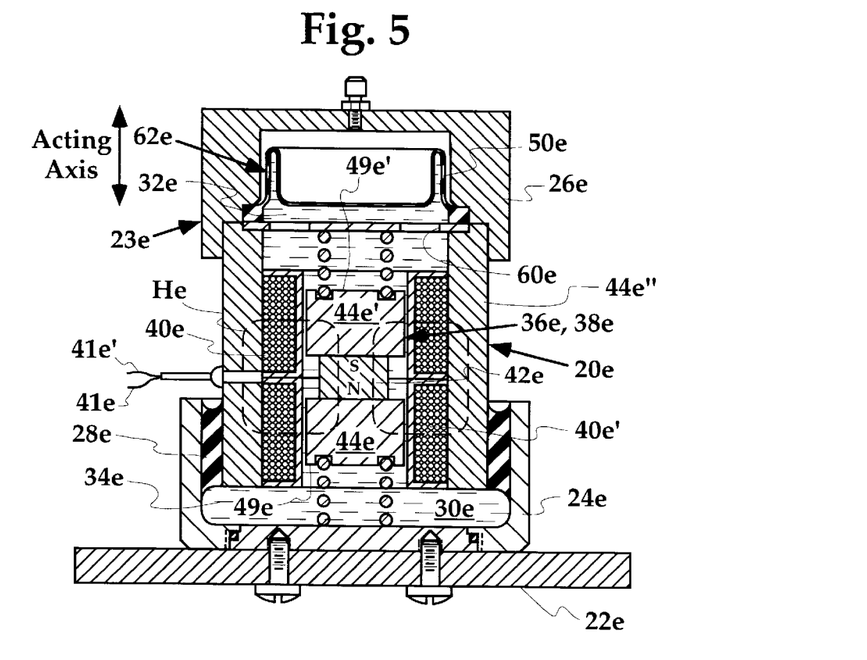
FIG. 5 is a cross-sectioned side view of another fluid-filled AVA including a moving magnet-and-pole assembly comprising the piston.

FIG. 4 and FIG. 5 illustrate several other embodiments of AVAs 20d, 20e which including housings 24d, 24e for attachment to members 22d, 22e. In each of these embodiments, a fluid 34d, 34e substantially fills the first and second fluid chambers, 30d, 30e and 32d, 32e, respectively. In each embodiment, series connected and alternately wound multiple coils, 40d, 40d', 40e, 40e' generate dynamic magnetic fields which are generally opposed to each other and which interact with static (standing) magnetic fields generated and directed by, disc shaped permanent magnets 42d, 42e and pole pieces, 44d, 44d', 44d", 44e, 44e', 44e", respectively.

In the FIG. 4 embodiment, the centering springs of the previous embodiments have been eliminated. A ferro-fluid is used for the working fluid 34d. Ferro-fluid compositions are described in U.S. Pat. No. 5,147,573 to Chagnon entitled "Superparamagnetic Liquid Colloids" and U.S. Pat. No. 4,356,098 to Chagnon entitled "Stable Ferro-fluid Compositions and Methods of Making Same." The ferro-fluid interacting with the static magnetic field will suspend and center the magnet-and-pole assembly 38d, even without the centering springs. An optional positioning magnet 68d of sufficient strength attaches to plug 29d and acts to center the magnet-and-pole assembly 38d, if the poles 44d, 44d' are somewhat axially offset (statically) from wound coils 40d, 40d'. In each embodiment, an air-type compensator 62d, 62e is preferably used. The FIG. 5 embodiment includes at least one, and preferably, a plurality of ports 60e. In each embodiment, the flexible partitions 50d, 50e of volume compensators 62d, 62e define the dynamic volume stiffnesses Kv'2 of second fluid chambers 32d, 32e. It should be understood, that it is preferable that the second fluid chambers 32d, 32e are significantly more flexible than the first flexible elements 28d, 28e in terms of bulge stiffness, i.e., have a significantly lower volumetric stiffness Kv'2 where Kv'2<<Kv'1.

In the FIG. 5 embodiment, the AVA 20e includes a preferably low viscosity fluid, such as glycol, silicone oil, hydrocarbon oil, perfluorinated polyether, or the like. In both the FIG. 4 and FIG. 5 embodiments, energizing the leads 41d, 41d' and 41e, 41e' will produce generally-opposed dynamic magnetic fields which interact with the localized static magnetic fields Hd, Henear each pole piece, 44d, 44d', 44e, 44e'. This magnetic interaction drives the magnet-and-pole assemblies 38d, 38e, thereby causing pistons 36d, 36e to oscillate and pump fluid 34d, 34e via the terminal end portions 49d, 49d' and 49e, 49e' to produce dynamic pressure variations within first and second fluid chambers 30d, 32d and 30e, 32e. This dynamically drives the primary masses 23d, 23e which preferably include additional inertial tuning masses 26d, 26e to control vibration of members 22d, 22e.

Figure 6:
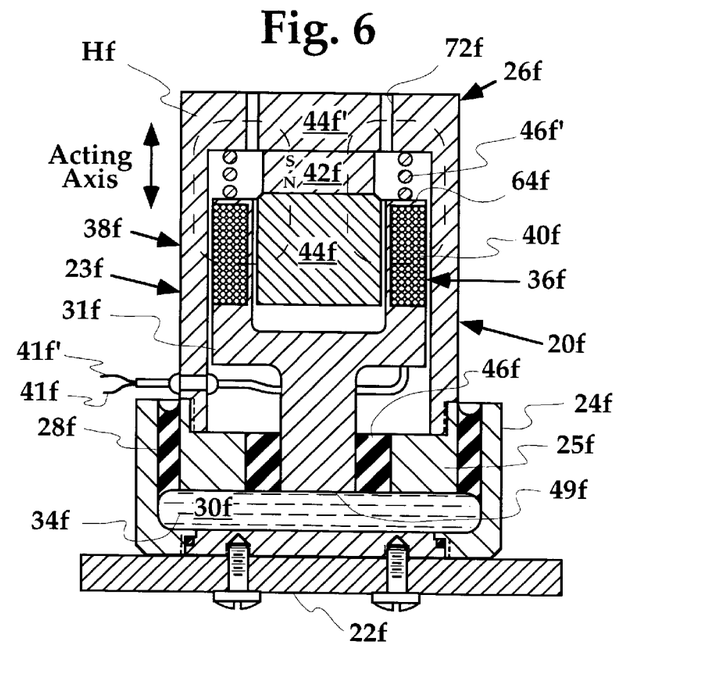
FIG. 6 is a cross-sectioned side view of fluid-filled AVA including a single fluid chamber and a moving coil assembly including the piston.
Figure 7:
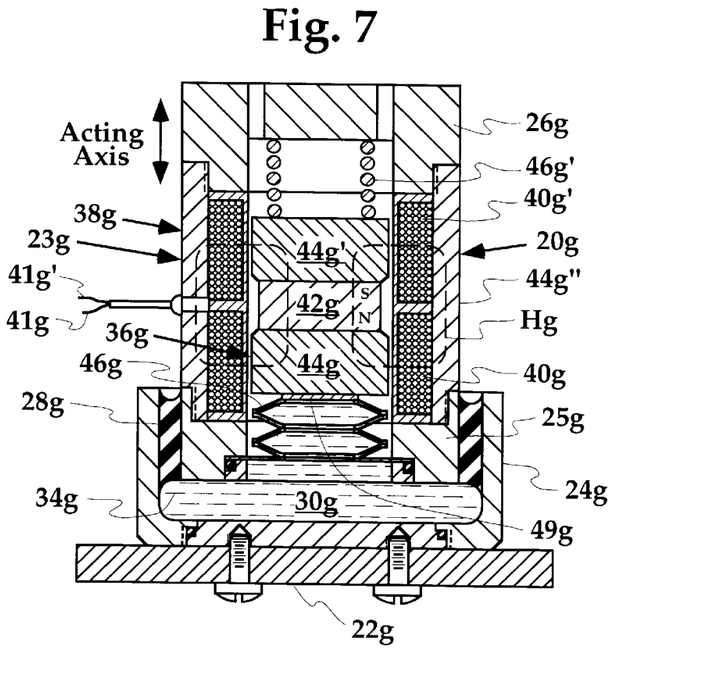
FIG. 7 is a cross-sectioned side view of another fluid-filled AVA including a single fluid chamber and a moving pole-and-magnet assembly.

FIG. 6 and FIG. 7 illustrates several other embodiments of fluid-filled AVAs 20f, 20g. In each embodiment there is only a "single" fluid chamber 30f, 30g. The fluid-filled AVA 20f of FIG. 6 includes housing 24f adapted for attachment to member 22f, flexible element 28f, a single fluid chamber 30f, primary mass 23f including an additional inertial tuning mass 26f, piston 36f having a terminal end portion 49f interacting with fluid 34f contained therein, and means for driving the piston 36f. In this embodiment, the piston 36f includes piston body 31f, bobbin 64f, and coil 40f. Piston body 31f and bobbin 64f are preferably one-piece construction and are manufactured from nonmagnetic materials, such as plastic, or the like. Bobbin 64f has wound thereon, a number of circumferential hoop winds of copper wire, which forms the coil 40f. Piston 36f is preferably centered and supported by centering springs 46f, 46f'. Preferably centering spring 46f is an annular-shaped tube-form elastomer section and provides part of the volume stiffness Kv of fluid chamber 30f which centering spring 46f' is a coil spring or the like. Other springs such as Bellville, washer, conical, cantilever, or reed-type may be used.

Magnet-and-pole assembly 38f is comprised of at least one permanent magnet 42f, and pole pieces 44f, 44f'. Primary mass 23f is comprised of pole pieces 44f, 44f', permanent magnet 42f, and nonmagnetic cap 25f. Pole pieces 44f, 44f', and magnet 42f, and coil 40f comprise the magnetic circuit. A portion of magnetic field Hf is approximated by dotted flux lines. Cap 25f threads onto pole piece 44f' which, in turn, precompresses centering spring 46f' and shears centering spring 46f. First centering spring 46f is preferably bonded to piston body 31f and cap 25f via known bonding processes.

The AVA 20f is preferably tuned by adjusting the secondary mass Mt including the piston 36f, secondary stiffnesses including stiffness of centering springs 46f, 46f', volume stiffness of the first flexible element 28f, and volume stiffness Kv of centering spring 46f. Further, tuning is accomplished by adjusting the primary mass 23f including the additional inertial tuning mass 26f, cap 25f, and magnet-and-pole assembly 38f, and primary stiffnesses including the axial stiffness of first flexible element 28f and volume stiffness Kv'1, amongst other factors (see Eqn. 17). It should be understood that all of the above will effect, to some degree the position of the primary and secondary resonances fn1, fn2.

Energizing leads 41f, 41f' with alternating electrical current supplies current to coil 40f which causes piston 36f to dynamically oscillate, as commanded, and compress the fluid 34f in first fluid chamber 30f. This causes fluid pressure variations which produce active dynamic forces which act on member 22f to control vibration thereof. Preferably, relief ports 72f provide cooling and eliminate back pressure due to piston 36f oscillation.

FIG. 7 illustrates another embodiment of AVA 20g which comprises a housing 24g adapted for attachment to member 22g, a tube-form elastomer flexible element 28g, a "single" fluid chamber 30g, a moveable piston 36g including a terminal end portion 49g, a fluid 34g contained therein, and means for driving piston 36g. In this embodiment, the piston 36g is comprised of a magnet-and-pole assembly 38g comprised of pole pieces 44g, 44g' spaced on either side of a disc-shaped permanent magnet 42g. A portion of magnetic field Hg is approximated by dotted flux lines shown. Magnet-and-pole assembly 38g is driven by multiple wound coils 40g, 40g'. The coils 40g, 40g' are arranged in electrical series relationship, yet alternately wound (one clockwise and the other counterclockwise) to produce dynamic magnetic fields in opposition to one another. Piston 36g is preferably centered and supported by centering springs 46g, 46g'. Preferably, centering spring 46g is a welded steel bellows spring which exhibits very high volume stiffness Kv, yet low axial stiffness. Therefore, as installed, the centering spring 46g does not contribute to the volume stiffness Kv of the single fluid chamber 30g appreciably. Preferably, centering spring 46g would be glued to pole piece 44g or precompressed thereagainst. Second spring preferably comprises a coil-type spring.

Magnet-and-pole assembly 38g is comprised of disc-shaped magnet 42g, and pole pieces 44g, 44g', 44g". Primary tuning mass 23g is comprised of pole piece 44g", additional inertial tuning mass 26g, and cap 25g. Cap 25g and inertial tuning mass 26g, are preferably manufactured from a nonmetallic material, such as copper, brass, or aluminum. Cap 25g threads onto pole piece 44g" and precompresses centering springs 46g, 46g' which properly centers and positions piston 36g, which comprises a portion of the magnet-and-pole assembly 38g. The primary and secondary resonances fn1, fn2 of the fluid-filled AVA 20g are preferably tuned by adjusting the masses of a portion of the magnet-and-pole assembly 38g (i.e., the piston 36g), stiffness of centering springs 46g, 46g', volume stiffness Kv of the flexible element 28g, masses of cap 25g, pole piece 44g", and additional inertial tuning mass 26g, and axial stiffness of the flexible element 28g.

Energizing leads 41g, 41g' with electrical current and, thereby, supplying electrical current to alternately wound coils 40g, 40g', causes piston 36g to dynamically oscillate, as commanded, and terminal end 49g compresses fluid 34g in first fluid chamber 30g. This causes fluid pressures to act against housing 24g and produce active forces which act on member 22g.

FIG. 8 illustrates a hypothetical performance curve of the fluid-filled AVA 20a. In particular, the plot illustrates the output force of the fluid-filled AVA, in pounds, versus frequency, in Hz. The plot of output force, as illustrated by dotted plot 74, shows resonances located at 76 and 78 which correspond to the primary resonance fn1 and secondary resonance fn2. Hatched portions, 80 and 82, pictorially illustrate the ranges of primary disturbance frequency fd1 and secondary disturbance frequency fd2. It is preferable that the primary and secondary resonances fn1, fn2 as denoted by 76 and 78, are tuned such that they substantially coincide with the primary and secondary disturbance frequencies fd1, fd2 which preferably fall within ranges 80 and 82, respectively. More preferably, fn1 should be tuned to the low end of the fd1 range while fn2 should be tuned to the high end of the fd2 range.

While several embodiments including the preferred embodiment of the present invention have been described in detail, various modifications, alterations, changes and adaptations to the aforementioned may be made without departing from the spirit and scope of the present invention defined in the appended claims. It is intended that all such modifications, alterations, and changes be considered part of the present invention.

What is claimed is:

1. An Active Vibration Absorber (AVA) adapted for controlling vibration of a member, comprising:
    (a) a housing,
    (b) means for attaching said housing to the member whose vibration is to be controlled,
    (c) a first flexible element having an axial dynamic stiffness,
    (d) a resonatable primary tuning mass flexibly suspended relative to said housing by said flexible element, wherein when in operation, said primary tuning mass is constrained substantially solely by said first flexible element,
    (e) a first fluid chamber having a defined volume stiffness (Kv'1),
    (f) a fluid contained in said first fluid chamber,
    (g) a moveable piston in fluid contact with and interacting with said fluid in said first fluid chamber, and
    (h) means for actively driving said moveable piston causing dynamic pressure variations in said first fluid chamber, said pressure variations causing said primary tuning mass and to resonate thereby producing active control forces.

2. The AVA of claim 1 further including a second fluid chamber interactive with said moveable piston, said second fluid chamber also exhibiting a defined volume stiffness (Kv'2).

3. The AVA of claim 1 wherein a mass of said primary tuning mass, said axial dynamic stiffness of said first flexible element, and said volume stiffness of said first fluid chamber are selected to tune a first tuned resonant frequency (fn 1) of said AVA.

4. An AVA of claim 1 wherein a mass of said piston, said volume stiffness of said first fluid chamber, and a cross-sectional fluid pumping area of said first fluid chamber are selected to tune a second tuned resonant frequency (fn2) of said AVA.

5. The AVA of claim 1 further comprising a third fluid chamber wherein said moveable piston is included within said third fluid chamber.

6. The AVA of claim 5 wherein said fluid within said third fluid chamber is pumped by said moveable piston to and from said third fluid chamber and into and out of said first fluid chamber.

7. The AVA of claim 6 wherein said fluid is pumped to and from said third fluid chamber through ports.

8. The AVA of claim 1 further including a unitary motor unit comprising;
   (a) a permanent magnet,
   (b) a wound coil,
   (c) pole pieces, and
   (d) said moveable piston.

9. The AVA of claim 1 wherein said moveable piston is further comprised of piston body having a bobbin which is circumferentially wound with a coil, said piston body having an axially extending projection including a terminal end portion which interacts with said first fluid chamber.

10. The AVA of claim 1 wherein said primary tuning mass further comprises a coil.

11. The AVA of claim 1 wherein said primary tuning mass further comprises at least one permanent magnet.

12. The AVA of claim 1 wherein said primary tuning mass further comprises at least one pole piece.

13. The AVA of claim 1 wherein said primary tuning mass further comprises an additional inertial tuning mass.

14. The AVA of claim 1 wherein said moveable piston exhibits an annular shape and includes a coil of wire wound about a nonmagnetic bobbin, said nonmagnetic bobbin further including first and second terminal end portions adapted for pumping said fluid.

15. The AVA of claim 1 which exhibits a first resonant frequency (fn1) and a secondary resonant frequency (fn2).

16. The AVA of claim 15 wherein said first resonant frequency (fn1) is tuned to provide efficient operation at a primary disturbance frequency (fd1) and said second resonant frequency (ff2) is tuned to provide efficient operation at a secondary disturbance frequency (fd2).

17. The AVA of claim 1, wherein said means for driving said moveable piston is comprised of:
   (a) a wound coil, and
   (b) a magnet-and-pole assembly including at least one permanent magnet and pole pieces.

18. The AVA of claim 17 wherein said wound coil and said magnet-and-pole assembly are stationary relative to each other and said moveable piston is inductively driven due to inductive coupling between a static magnetic field generated within said magnet-and-pole assembly and a dynamic magnetic field generated about said moveable piston by supplying electrical current to said wound coil thereby inducing electrical current to flow in said moveable piston.

19. The AVA of claim 17 wherein said magnet-and-pole assembly is further comprised of a plurality of permanent magnets spaced on opposite sides of a pole piece.

20. The AVA of claim 1 wherein said fluid is a ferro-fluid.

21. The AVA of claim 1 wherein said moveable piston is driven by opposed magnetic fields produced by two adjacent wound coils and said moveable piston further comprises a portion of a magnet-and-pole assembly, said portion including a permanent magnet with first and second pole pieces attached upon opposite ends thereof.

22. An active vibration absorber for attachment to, and controlling dynamic vibration of, a member, comprising:
   (a) a housing adapted for attachment to the member,
   (b) a flexible element,
   (c) a resonatable primary tuning mass flexibly suspended relative to said housing by said flexible element, wherein when in operation, said primary tuning mass is constrained substantially solely by said first flexible element,
   (d) first and second fluid chambers within said Active Vibration Absorber (AVA), each having a defined volume stiffness (Kv'1 and Kv'2),
   (e) a fluid contained in said first and second fluid chambers,
   (f) a moveable piston interacting, and in fluid contact, with said fluid in said first and second fluid chambers, and
   (g) a coil and magnet-and-pole assembly for driving said moveable piston to cause pressure variations therein which causes said primary tuning mass to resonate and produce active control forces.

23. An active vibration absorber for producing control forces to control vibrations of a structure, comprising:
   (a) a housing adapted for attachment to the structure,
   (b) a flexible element exhibiting an axial dynamic stiffness,
   (c) a resonatable primary tuning mass flexibly suspended relative to said housing, said axial dynamic stiffness of said flexible element and a mass of said primary tuning mass being selected such that said active vibration absorber exhibits a primary resonant frequency (fn 1), wherein when in operation, said primary tuning mass is constrained substantially solely by said first flexible element,
   (d) first and second fluid chambers having a defined volume stiffness (Kv'1 and Kv'2),
   (e) a fluid contained in said first and second fluid chambers,
   (f) a moveable piston whose mass is selected such that it exhibits a secondary resonant frequency (fn2), said moveable piston being interactive, and in fluid contact, with said first and said second fluid chambers, and
   (g) means for driving said moveable piston, said means including a magnet-and-pole assembly having at least one permanent magnet, and a wound coil which upon electrical energization, drives said moveable piston producing pressure variations which dynamically resonante said primary tuning mass to produce said control forces.

* * * * *